April 23, 1957     E. WEIL     2,789,305
SPONGE RUBBER DISH WASHER
Filed July 20, 1954     2 Sheets-Sheet 2
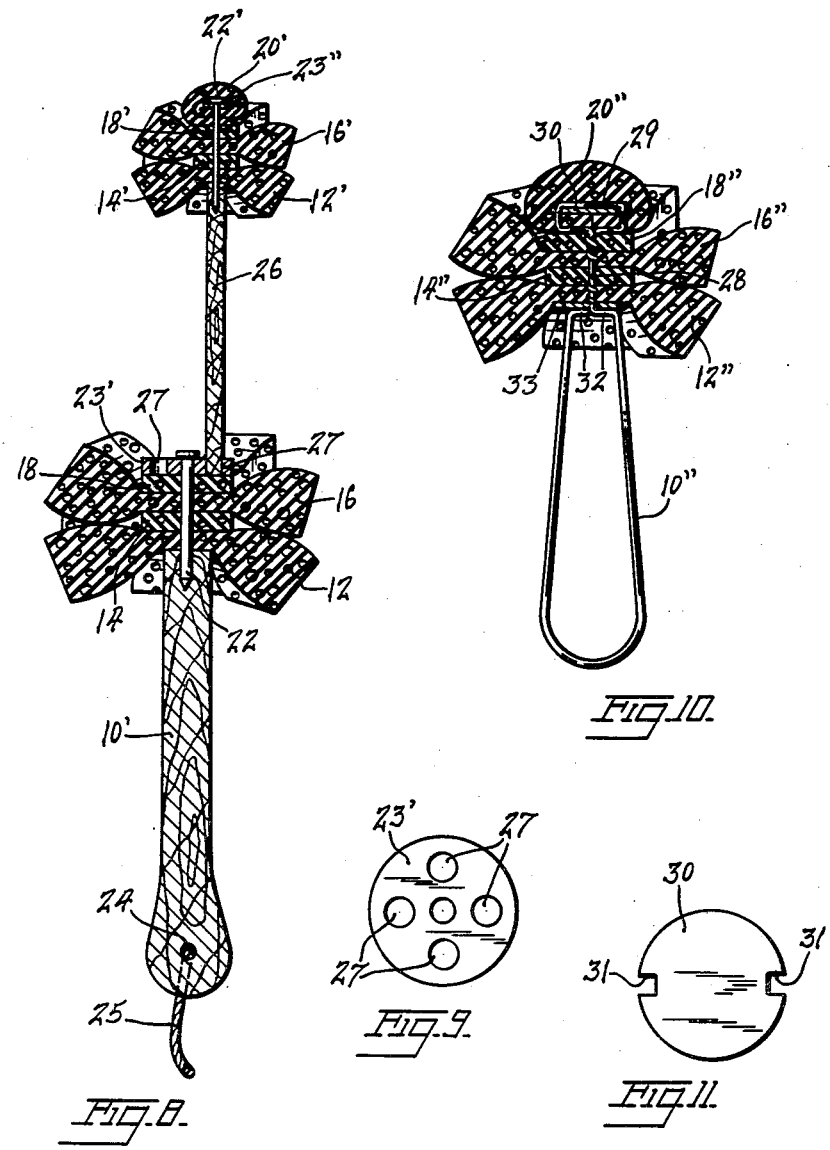
INVENTOR.
EDWARD WEIL
BY
ATTORNEY United States Patent Office 2,789,305
Patented Apr. 23, 1957

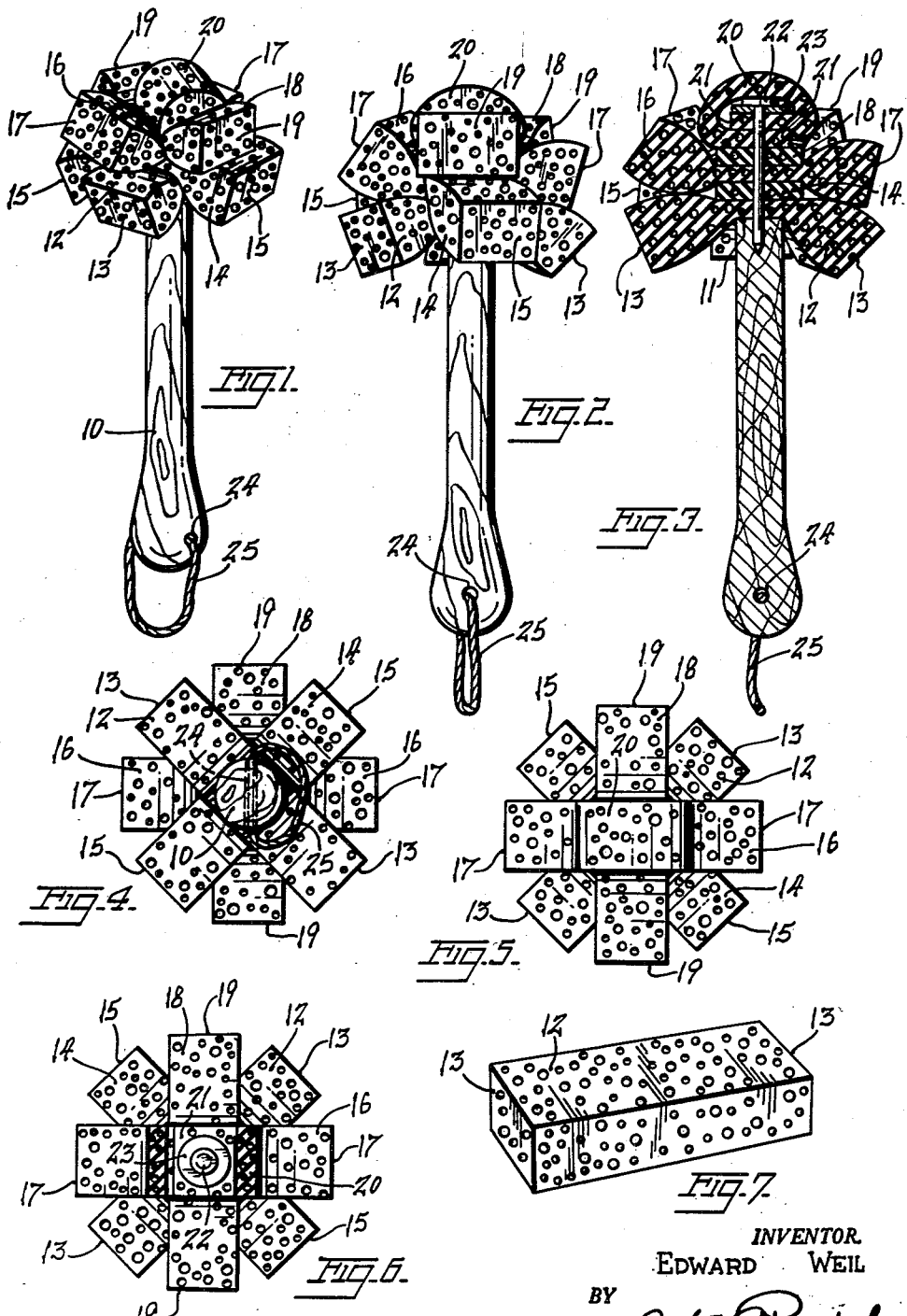

2,789,305

SPONGE RUBBER DISH WASHER

Edward Weil, Leonia, N. J.

Application July 20, 1954, Serial No. 444,460

1 Claim. (Cl. 15—244)

This invention relates to dish washing devices and, more particularly, to a new and useful improvement in a sponge rubber dish washer.

A principal object of the invention is to provide a dish washer formed of strips or blocks of sponge rubber arranged in a novel manner to form a soft cleaning head portion completely covering one end of a handle in order to protect the surface being cleaned from scratches and the like, the head being shaped so as to contact the entire area and clean the crevices of cylindrical articles of glassware, dishes and the like.

Another object of the invention is to provide a dish washer formed of rectangular-shaped sponge rubber blocks or strips arranged in criss-cross fashion with their free ends superposed in offset relation to present free corners and edges to the surface being cleaned.

A further object of the invention is to provide a dish washer which is resistant to permanent deformation under the stress of use.

Yet another object is to provide a wish washer which does not become soft or sticky when subjected to hot water and is resistant to soaps or other mild alkalies and acids encountered in ordinary use.

It is further proposed to produce a dish washing device which is simple and rugged in construction and which may be manufactured and sold at a reasonable cost.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view embodying one form of a dish washing device.

Fig. 2 is a side elevational view thereof.

Fig. 3 is a vertical sectional view thereof taken through the center of the device.

Fig. 4 is a bottom plan view thereof.

Fig. 5 is a top plan view thereof.

Fig. 6 is a view similar to Fig. 5 with parts being broken away.

Fig. 7 is a perspective view of a block of sponge rubber forming the cleaning head of the device.

Fig. 8 is a view similar to Fig. 3 but showing the preferred form of the invention.

Fig. 9 is a plan view of a washer member of the form of Figs. 8.

Fig. 10 is a view similar to Fig. 3 but showing a further modification of the device.

Fig. 11 is a top plan view of a washer member of Fig. 10.

Referring to the first form of the device shown in Figs. 1 to 7, inclusive, the dish washer includes an elongated solid handle 10 which for the purpose of lightness and economy, is preferably made of wood, but which may, if desired, be made of metal or other suitable material. The handle is elongated and of any desired shape so as to be readily grasped by the hand of the operator and is formed with one end flat as indicated at 11.

An elongated rectangular-shaped block 12 of sponge rubber having rectangular ends 13 is positioned across the flat end 11 of the handle. The flat end of the handle contacts the block midway the ends of the block so as to leave an equal amount of material of the block extending laterally of or overhanging the handle on either side thereof as viewed in Fig. 2. Another similar-shaped block 14 of sponge rubber is superposed over the block 12 and is disposed at right angles thereto so that its protruding rectangular ends 15 are positioned ninety degrees from the rectangular ends of the bottom block 12 and extend laterally of the handle. Another block 16 similar in construction and material to the blocks 12 and 14 is superposed over the block 14 at an angle of approximately forty-five degrees thereto so that its free rectangular ends 17 are positioned intermediate the rectangular ends of the blocks 12 and 14. A further block 18 similar to the other blocks is superposed over the block 16 at an approximately forty-five degrees angle so that its rectangular ends 19 are positioned intermediate the rectangular ends of the blocks 14 and 16.

The centers of the blocks are aligned with each other and another block 20 of similar construction and material is looped or folded upon itself and its free ends 21 overlapped and positioned over the center of the outermost block 18. A nail 22 driven through the overlapped ends 21 of block 20, and the centers of the other blocks fastens the blocks securely to the handle 10. A washer member 23 of rigid material is interposed between the head of the nail 22 and the overlapped ends of the block 20 within the looped portion thereof so that both the head of the nail and the washer device are covered and concealed from view. The blocks of sponge rubber may be variously colored in order to enhance the attractiveness of the device.

A cleaning head is thus provided having freely movable elements which are adapted to assume the shape of the cylindrical article of glassware or the like being cleaned so that the entire inner periphery thereof including the crevices therein will be reached by the cleaning elements. The bendability of the free ends of the sponge rubber blocks furnish intimate contact with the surface being cleaned and the square ends exert a wiping action when the cleaning head is being pushed either into or out of the vessel being cleaned.

The looped block 20 covers the nail and washer device so that no rigid part is exposed thereby protecting the surface being cleaned from being marred or damaged during the cleaning operation. The block 20 also finishes off the cleaning head and adds to the attractiveness thereof.

The handle 10 may have a transverse hole 24 therethrough to receive a string 25 for hanging the washer on a supporting surface.

In the preferred form of the invention shown in Figs. 8 and 9, a cylindrical stem 26 of wood is preferably secured to the washer member 23' thereby forming a prolongation of the device. The stem 26 is fitted in one of a series of spaced openings 27 formed around the washer member and is held therein by friction. Blocks 12', 14', 16' and 18' similar to blocks 12, 14, 16 and 18 of the form of Fig. 1 are similarly supported and arranged on the stem 26. A looped block 20' of sponge rubber has its ends overlapped and positioned over the center of the outermost block 18'. A nail 22' passing through the centers of the blocks and the overlapped ends of the looped block 20' fastens the blocks to the stem 26. A rigid washer 23'' is interposed between the head of the nail 22' and the overlapped ends of the block 20' within the looped portion of said latter block so that both the nail head and washer device are covered and concealed.

It will be noted that the outer cleaning head supported by the stem 26 is offset from the axis of the cleaning head supported by the handle 10'. This modified form of the invention is especially adapted for cleaning elongated cylindrical glassware or other similar articles.

In all other respects, the form of the invention shown in Figs. 8 and 9 is similar to the form shown in Fig. 1 and similar reference characters are used to indicate similar parts.

Referring now to the modification of the device shown in Figs. 10 and 11, a piece of wire is looped upon itself at one end to provide an elongated looped handle portion 10″ and is formed with a twisted straight portion forming a shank extension 28 extending through the centers of blocks 12″, 14″, 16″, and 18″ similar in construction to blocks 12, 14, 16 and 18, respectively, of the form of invention of Fig. 1. The shank extension continues into a flat looped portion 29 which passes through the free ends of a looped block 20″ similar to block 20, and over a washer member 30 and through notches 31 formed in the peripheral edge of the washer member. The blocks are clamped between the upper washer member 30 and a lower washer member 33 seated on the shouldered portions 32 of the handle 10″.

It is too understood that the cleaning blocks may be made of natural sponge, cellulose or any other sponge material and the holding means could be in the form of nails, screws, rivets, nuts, bolts, etc.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described by invention, what I claim as new, and desire to secure by United States Letters Patent is:

A dish washer comprising an elongated handle and a cleaning head supported on one end of said handle, said head comprising a plurality of elongated rectangular-shaped blocks of sponge rubber superposed on each other in criss-cross fashion over their center portions, the blocks being arranged so that their free rectangular ends are offset from each other and protrude laterally of the handle, means for fastening the blocks to the handle including a washer device, a stem supported by said washer device and forming an extension of the cleaning head, a cleaning head on the outer end of said stem, said latter head including a number of sponge rubber blocks superposed on each other in criss-cross fashion, a nail for securing the blocks to the stem and a looped block of sponge rubber secured to said nail and covering the same.

References Cited in the file of this patent

UNITED STATES PATENTS

| | | |
|---|---|---|
| 373,747 | Mansfield | Nov. 22, 1887 |
| 1,890,894 | Arnold et al. | Dec. 13, 1932 |
| 2,233,289 | Hatzenbuehler | Feb. 25, 1941 |
| 2,290,216 | Steinmetz et al. | July 21, 1942 |
| 2,732,574 | Gesell et al. | Jan. 31, 1956 |
| 2,741,787 | Palma et al. | Apr. 17, 1956 |

FOREIGN PATENTS

| | | |
|---|---|---|
| 22,667 | Great Britain | Nov. 25, 1893 |
| 503,279 | Belgium | June 15, 1951 |